UNITED STATES PATENT OFFICE.

BERNARDUS JOHANNES FRANCISCUS VARENHORST, OF THE HAGUE, AND JEAN GÉRARD FOL, OF DELFT, NETHERLANDS.

PROCESS FOR REGENERATING VULCANIZED RUBBER AND THE LIKE.

1,198,975.  Specification of Letters Patent.  Patented Sept. 19, 1916.

No Drawing.  Application filed May 4, 1914.  Serial No. 836,342.

*To all whom it may concern:*

Be it known that we, BERNARDUS JOHANNES FRANCISCUS VARENHORST, a subject of the Queen of the Netherlands, and residing at 25 Jacob Gillesstraat, The Hague, in the Kingdom of the Netherlands, and JEAN GÉRARD FOL, a subject of the Queen of the Netherlands, and residing at 79 Oude Delft, Delft, in the Kingdom of the Netherlands, have invented certain new and useful Improvements in Processes for Regenerating Vulcanized Rubber and the like, of which the following is a full, clear, and exact description.

The subject of the present invention is a process for the regeneration of vulcanized rubber, soft rubber, ebonite, gutta percha, and the like.

The characteristic feature of the process consists in the fact that the bodies to be regenerated are treated under two conditions, that is to say: I, the mass is subjected to direct heating, and, II, this heating is effected, either by treating the mass *in vacuo*, or instead of the vacuum by exposing the mass to the influence of inert gases.

The process, therefore, may be carried out according to two fundamental methods: either (*a*) heating the mass *in vacuo*, or (*b*) heating the mass in the presence of inert gases.

By this process a product of high value is obtained.

According to the nature and constitution of the mass to be regenerated, the heating may be carried right up to the limit short of melting, but it is characteristic of the present process that this melting of the mass must be avoided.

In order to effect a regular heating of the mass and thus to obtain a product completely regular and homogeneous in its structure, the heated mass may, whether treated according to the vacuum process or with inert gases, be subjected during the heating to a continuous stirring.

The regenerating process may be influenced by subjecting the heated mass, that is to say the mass brought to the appropriate temperature, to a sudden cooling, by subjecting it to the sudden action of cold water or other fluids which are adapted to exercise a cooling action on the mass, as for example soda solution, lyes, or the like.

According to the nature of the material a greater or smaller arrest of the course of the process is brought about by this sudden cooling, whereby the physical properties of the material are improved, an easily workable product being obtained. The sudden cooling of the heated mass serves at the same time to prevent the occurrence of melting.

We will now describe an example of the practical working of the process.

The old used rubber articles are, if necessary, first washed and then ground up small. The ground-up rubber is if necessary boiled in a soda solution or lye. The material treated in this manner is treated (depolymerized) by heating *in vacuo* or in an atmosphere of inert gases (carbon dioxid, nitrogen, or the like), it being necessary carefully to avoid a melting of the mass. When a sufficient degree of depolymerizing has been attained the mass is rapidly cooled, by turning it out into cold water, for example, after which the mass is allowed to dry in a suitable manner, *in vacuo* for example, and is then rolled out in the usual manner or otherwise formed. Where necessary the mass may be still further cleaned by boiling it with a soda or lye solution, and afterward drying *in vacuo* and further treating by rolling.

By the term vulcanized rubber used in the claim, we mean not only vulcanized rubber, but soft rubber, ebonite, gutta-percha and like materials; and the term alkaline solutions is used to include solutions of soda, caustic soda, or other equivalent solutions.

What we claim is:

The process of regenerating vulcanized rubber which consists in comminuting the material, boiling it in an alkaline solution, and heating the entire mass of material in an atmosphere of inert gas to a temperature approximating but short of the melting-point, and continuously stirring the mass.

In testimony whereof we affix our signatures in presence of two witnesses.

BERNARDUS JOHANNES
  FRANCISCUS VARENHORST.
JEAN GÉRARD FOL.

Witnesses:
  PHILIPPIE JOSEPH HOK,
  I. I. HELSDON REX.